United States Patent
Savary-Sismondini et al.

(10) Patent No.: US 8,369,183 B2
(45) Date of Patent: Feb. 5, 2013

(54) ANALYSIS OF FRACTURE NETWORKS

(75) Inventors: Berengere Savary-Sismondini, Stavanger (NO); Hilde Grude Borgos, Hafrsfjord (NO); Michael Nickel, Hafrsfjord (NO); Lars Sonneland, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 367 days.

(21) Appl. No.: 12/630,119

(22) Filed: Dec. 3, 2009

(65) Prior Publication Data

US 2010/0149913 A1    Jun. 17, 2010

(30) Foreign Application Priority Data

Dec. 17, 2008    (GB) .................................. 0823004.7

(51) Int. Cl.
*G01V 1/30*    (2006.01)
(52) U.S. Cl. ................. 367/38; 367/25; 702/11
(58) Field of Classification Search ............ 367/73, 367/38, 25; 702/11, 14
See application file for complete search history.

(56) References Cited

U.S. PATENT DOCUMENTS

| | | | |
|---|---|---|---|
| 5,574,218 A | 11/1996 | Withers | |
| 5,586,082 A * | 12/1996 | Anderson et al. | 367/73 |
| 5,771,170 A | 6/1998 | Withers et al. | |
| 6,240,370 B1 | 5/2001 | Sonneland et al. | |
| 6,640,190 B2 | 10/2003 | Nickel | |
| 7,082,368 B2 | 7/2006 | Nickel | |
| 7,203,342 B2 | 4/2007 | Pedersen | |
| 2008/0225640 A1 | 9/2008 | Akbar et al. | |

FOREIGN PATENT DOCUMENTS

WO    2008086352 A1    7/2008

OTHER PUBLICATIONS

Lingley et al, "A workflow change to understanding faulting in complex reservoirs," Science-Technology Conference 30 Years Petroleum Industry: New Challenges and Opportunities, pp. 1-12, Aug. 24-25, 2005.*

Efron, Bradley, "The Bootstrap and Modern Statistics", Journal of American Statistical Association, vol. 95, No. 452, Dec. 2000, pp. 1293-1296.

L.R. Lines, et al, "Detecting "subseismic features" in time-lapse seismology: Feasibility studies for fractures and wormholes in producing reservoirs", SEG/San Antonio 2007 Annual Meeting, vol. 26, 2007, pp. 899-901.

* cited by examiner

*Primary Examiner* — Ian Lobo

(57) ABSTRACT

A method of analysing the dynamic behavior of fracture networks in a seismic volume is provided. The method includes providing a plurality of seismic time lapse vintages of the same geological volume; identifying and parameterising fractures within fracture networks of each vintage; determining one or more distributions of fracture parameters for the fracture networks of each vintage; and identifying changes to the fracture networks by comparing corresponding distributions across the vintages.

29 Claims, 5 Drawing Sheets

ANALYSIS OF FRACTURE NETWORKS

FIELD

The present invention relates to a method of analysing the dynamic behaviour of fracture networks in a seismic volume.

BACKGROUND

The characterisation of fractures in reservoir formations can be important for understanding and predicting the behaviour of reservoirs. For example, fractures intersecting drilled wells may assist the flow of hydrocarbons from the reservoir and so increase production. Conversely, fractures may allow water to flow into wells and so decrease production.

Fractures at distances from drilled wells can also influence flow patterns at the wells. Furthermore, at distances from wells, generally only indirect seismic measurements of fractures are available, and so any information that can be extracted from seismic data can be of great value.

WO 2008/086352 describes a methodology for mapping fracture networks from seismic data using fracture enhancement attributes and fracture extraction methods.

For example, borehole data can be used to determine modes of fracture, and in particular whether fracture clusters or networks would be detectable in surface seismic data. It can also provide information on fracture network inclination (i.e. average inclination of the fractures in a network relative to the horizontal) and strike azimuth (i.e. average direction of intersection of the fractures in a network relative to the horizontal).

Discontinuity extraction software (DES), for example as described in U.S. Pat. No. 7,203,342, may then be utilised to extract 3D volumes of fracture networks from surface seismic data.

Extracted fracture networks may further be parameterised in terms of the strength of their seismic response, and on their length, height and width.

Lacking from such known methodologies for mapping fracture networks, however, is characterisation of the dynamic behaviour of fracture networks.

SUMMARY

An aim of the present invention, therefore, is to provide a methodology for obtaining a broader understanding of the changes that may take place in or around a reservoir over time.

Accordingly, a first aspect of the present invention provides a method of analysing the dynamic behaviour of fracture networks in a seismic volume, the method comprising the steps (a) to (d) of:

(a) providing a plurality of seismic time lapse vintages of the same geological volume;

(b) identifying and parameterising fractures within fracture networks of each vintage;

(c) determining one or more distributions of fracture parameters for the fracture networks of each vintage; and (d) identifying changes to the fracture networks by comparing corresponding distributions across the vintages.

Thus the method allows the dynamic behaviour of fracture networks to be characterised. In particular, changes to fracture signatures can be identified, providing well operators with information that may be significant, for example, in deciding whether well injection operations should be continued or discontinued, or whether a new well should be drilled in a particular location.

Typically, the geological volume is a sub-volume of a larger geological volume, and steps (a) to (d) are repeated for one or more further sub-volumes within the larger geological volume. Thus the method allows fracture networks to be analysed over relatively large geological volumes.

In step (a), the seismic time lapse vintages may be compensated for seismic velocity changes that can take place in the periods between vintages, for example, as a result of fluid flows into layers of the geological volume.

In step (d), each comparison between corresponding distributions across the vintages may include determining a quality metric for the comparison. The quality metric can allow an assessment of whether changes to the fracture networks across vintages are significant or merely the result of measurement uncertainty within the vintages.

In step (b), the identification may include determining a fracture enhancement attribute for the seismic time lapse vintages and identifying discontinuities in the attribute. Typically, the fracture enhancement attribute is individually determined for respective voxels of the vintages. A possible fracture enhancement attribute is dip deviation.

In step (b), the parameterisation can include determining any one or combination of (i) the strike azimuths of the fractures in each fracture network, (ii) the inclinations with respect to the horizontal of the fractures in each fracture network, and (iii) the areas of the fractures in each fracture network.

Preferably, in step (d), the comparison includes showing representations of the distributions of the fracture parameters in association with an image of the geological volume. For example, strike azimuth distributions of a fracture network can be represented by rose diagrams, and such diagrams can be overlayed on the geological volume image. If a quality metric for the comparison is determined, this can also be shown, e.g. by overlaying confidence intervals on the representation.

The method may comprise an initial step of performing seismic tests (e.g. using a seismic source and receivers) to obtain the time lapse vintages. The tests may be performed in the same or a different country or jurisdiction to the country or jurisdiction in which the subsequent steps in the analysis are performed.

A further aspect of the present invention provides the use of the method of analysis of the first aspect to manage the drilling or operation of a well. For example, a method of operating a well may include: performing a seismic test to obtain a first vintage of a geological volume, injecting a fluid into the well, performing a further seismic test to obtain a second vintage of the geological volume, analysing the seismic vintages using the method of the first aspect of the invention, and deciding whether to inject further fluid into the well on the basis of the changes identified in the fracture networks of the geological volume. In another example, a method of drilling a well may include: analysing seismic vintages for a geological volume using the method of the first aspect of the invention, determining a position for a well on the basis of the changes identified in the fracture networks of the geological volume, and drilling the well at that position.

A further aspect of the present invention provides a computer system configured to perform the method of the first aspect.

For example, a computer system may have a processor or processors configured to perform steps (b) to (d). The processors may be part of the same computer or parts of different, e.g. networked, computers. The system may have an input device for receiving the seismic vintages at step (a). The system may have one or more storage devices for storing the vintages and/or storing the results of steps (b) to (d). The computer system may have a display for showing representations of the distributions of the fracture parameters in association with an image of the geological volume.

Further aspects of the present invention provide (i) a computer program product carrying a program for performing the method of the first aspect, and (ii) a computer program for performing the method of the first aspect.

BRIEF DESCRIPTION OF THE DRAWINGS

Embodiments of the invention will now be described by way of example with reference to the accompanying drawings in which.

DETAILED DESCRIPTION

Figure 1:
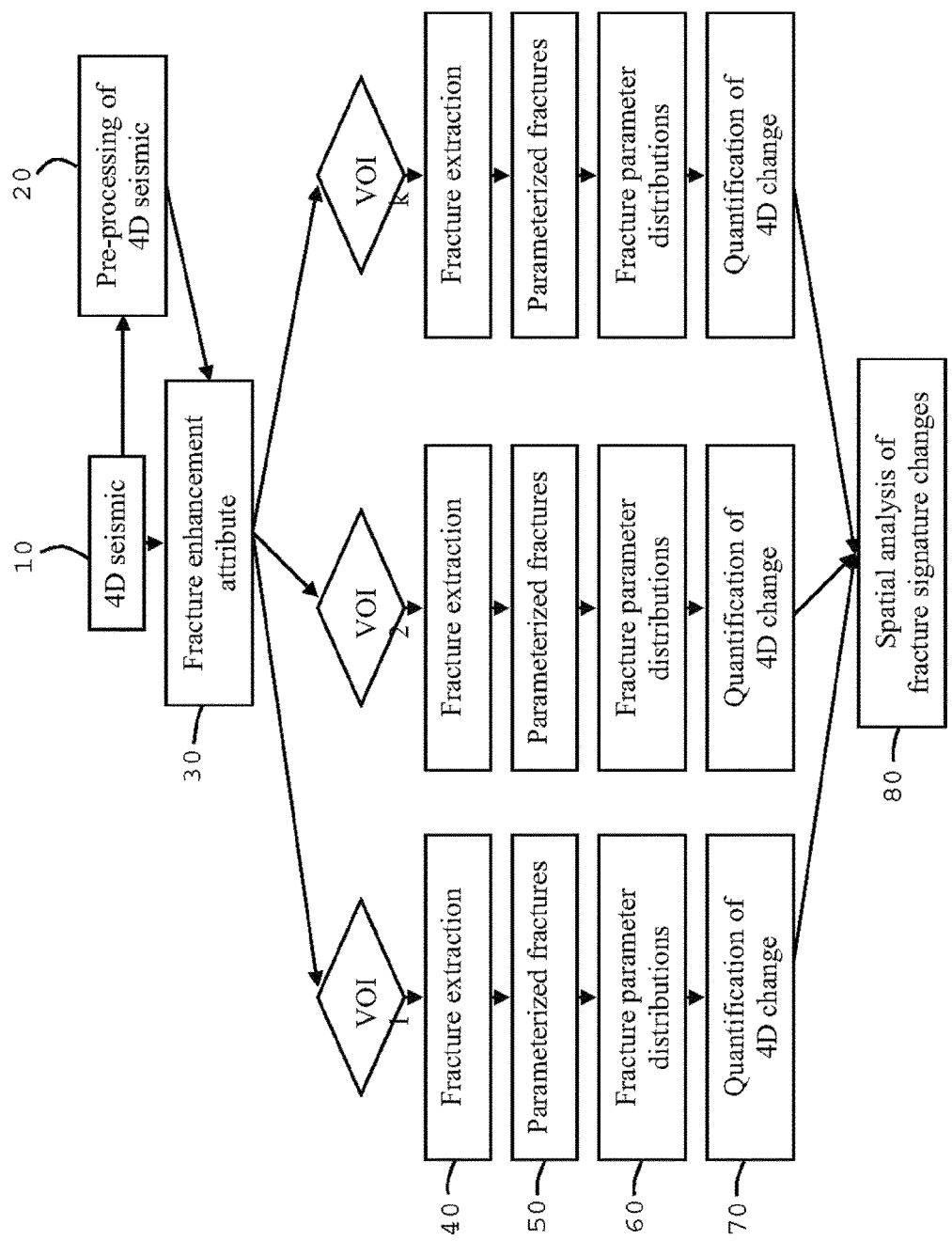
FIG. 1 shows a schematic overview of a method for analysing the dynamic behaviour of fracture networks in a seismic volume.

FIG. 1 shows a schematic overview of a method for analysing the dynamic behaviour of fracture networks in a seismic volume.

At step 10, seismic time lapse vintages (4D seismic) are obtained for a particular geological volume. The vintages may optionally be pre-processed at step 20 to obtain the same geometrical framework for all the vintages. Each vintage is then analysed at step 30 to calculate fracture enhancement attributes which allow fracture networks to be identified.

Having identified k sub-volumes VOI1, VOI2 . . . VOIk in the geological volume containing fracture networks, at step 40 fracture extraction is performed on the fracture enhancement attributes for each vintage, to obtain a geometrical representation of the fracture networks. The geometrical representations are parameterised at step 50 so that, at step 60, parameter distributions can be generated for the fracture networks of the sub-volumes. Changes to the fracture networks are identified at step 70 by comparing corresponding distributions across the vintages.

Finally, at step 80, spatial analysis of the changes to the fracture networks can be performed by displaying the distributions for the vintages in association with an image of the geological volume.

Below, the method is described in more detail.

4D Seismic

The method of the present invention takes as input a set of seismic time lapse vintages (4D seismic) of a particular geological volume. Methods for acquiring seismic vintages are well known to the skilled person. Each seismic vintage provides 3D seismic data for the volume, and is typically acquired months, or even years, apart from neighbouring vintages in the set.

Differences between the seismic vintages can be caused, for example, by migration and processing of the data. By applying the same algorithms to the data it should be possible to eliminate such differences.

Differences in the signals of the seismic vintages may also be caused by changes in velocity or by imperfect repeatability of the acquisition system. Imperfect repeatability may be due to, for example, changes in the positioning of the seismic source or receivers, changes in environmental parameters as tidal situation, temperature, humidity of the soil etc. Even with perfect repeatability, if there are layers with velocity changes, lower layers are influenced by the changes in the layers above and compensation will probably be necessary.

The compensation can be performed by pre-processing the seismic vintages. An example of pre-processing is seismic event correlation, as explained in U.S. Pat. No. 7,082,368. An alternative pre-processing scheme is described in U.S. Pat. No. 6,640,190.

U.S. Pat. No. 7,082,368 describes correlating data having different transmission modes with correspondingly different propagation velocities (e.g. transmission by longitudinal wave propagation correlated to transmission by transversal wave propagation). In the present invention, the approach of U.S. Pat. No. 7,082,368 is extended to compensate for velocity changes which may not be due just to different transmission modes (indeed the vintages may share the same transmission mode), but can be due to other phenomena causing velocity changes in the geological volume in the periods between vintages.

For example, fluid flow within fractures can produce velocity changes when the fluid present in the fractures is replaced by a fluid with other properties (e.g. pressure, temperature or chemistry) which causes differences in subsequent vintages. However, seismic event correlation can apply a nonlinear shift to the seismic data, to obtain the same geometrical framework for all the vintages.

Preferably, the repeatability of the seismic vintages is quantified using a quality metric before the subsequent analysis steps are performed. For example, if the noise level in the seismic data is too high, the analysis may not provide meaningful results.

One quality metric familiar to the skilled person that can be used is the normalised root mean square (NRMS) error. Calculating first a root mean square (RMS) error, individual differences between seismic vintages are determined and squared, and then averaged over a suitable window, the square root of that average providing the RMS error. Normalization to obtain the NRMS error is performed by dividing the RMS error by the corresponding root mean square over the same window of one of the vintages.

Identification of Fracture Networks

Pre-analysis of each of the vintages, for example through calculation of seismic attributes, and information from well logs (as described in WO 2008/086352), can then reveal 3D sub-volumes containing fracture networks for further analysis.

Fracture enhancement attributes enhance signals caused by fractures in seismic data. Preferably, fracture enhancement attributes are calculated in a consistent manner for all the vintages.

One example of a fracture enhancement attribute is dip deviation and is generated by first calculating the normal vector of the seismic layers in any voxel of the seismic data, where seismic layers are defined as surfaces where the seismic signal is equal to zero, surfaces where the perpendicular seismic trace is at a maximum or minimum (i.e. the derivative perpendicular seismic trace is zero), or any parallel or almost parallel surface in-between these two types of surfaces.

Implicit partial differentiation can be applied to obtain gradients of height surfaces defined as contours within a 3D volume. The surface where the seismic signal is zero is such a contour on the original seismic signal, and a surface where the perpendicular seismic trace is at a maximum or minimum is such a contour surface on the vertical derivative of the seismic signal. Implicit partial differentiation of the seismic signal, the generation of the vertical derivative, and implicit partial differentiation of the vertical derivative of the seismic signal all require calculations of partial derivatives of 3D signals. Partial derivatives of a 3D signal can, for example, be obtained using polynomial reconstructions of the seismic cube in the directions of derivation, as described in U.S. Pat. No. 6,240,370. The polynomial representation enables an analytical differentiation of the signal.

Thus, the normal vectors can be calculated by performing implicit partial differentiation on the original seismic data, to obtain normal vectors at points where the seismic is at or close to zero, and by performing implicit partial differentiation on the vertical derivative of the seismic trace, to obtain normal vectors at maxima and minima points where the vertical derivative of the seismic data is at or close to zero. Normal vector values at points which are not at or close to zero values of the seismic signal and are not at or close to minima or maxima of the perpendicular seismic trace can be obtained by vertically interpolating between the previously obtained values. Normal vector components can be interpolated one by one.

The dip angle of the normal vector at any seismic voxel is defined as the angle between the normal vector and its projection into the horizontal plane. The dip deviation is then defined as the difference between this dip angle, and a dip angle trend obtained by applying a 3D Gaussian filter to the respective dip angles of the seismic voxels. This procedure produces low values of dip deviation where the seismic layers are smooth, with minor differences between the local dip and the dip trend, and high values where there are abrupt local changes of the orientation of the seismic layers, for example due to fractures.

Figure 2:
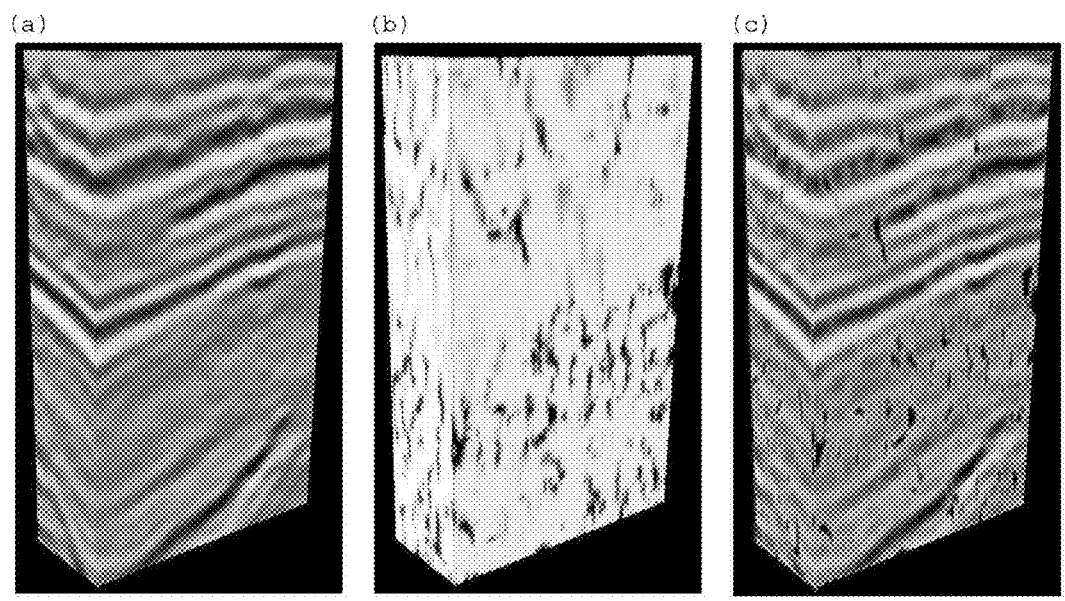
FIG. 2 shows (a) a seismic volume, (b) the calculated dip deviations for that volume, and (c) the dip deviations overlaid on the seismic volume.

FIG. 2 shows (a) a seismic volume, (b) the calculated dip deviations for that volume, and (c) the dip deviations overlaid on the seismic volume.

Having identified sub-volumes of interest, fracture extraction can be performed on the fracture enhancement attributes for each vintage, to obtain a geometrical representation of the fracture networks. Fracture extraction can proceed by identifying discontinuities in the fracture enhancement attribute.

One example of a fracture network extraction procedure is described in U.S. Pat. No. 7,203,342 and applies swarm intelligence through the deployment of artificial ants into the attribute volumes.

Figure 3:
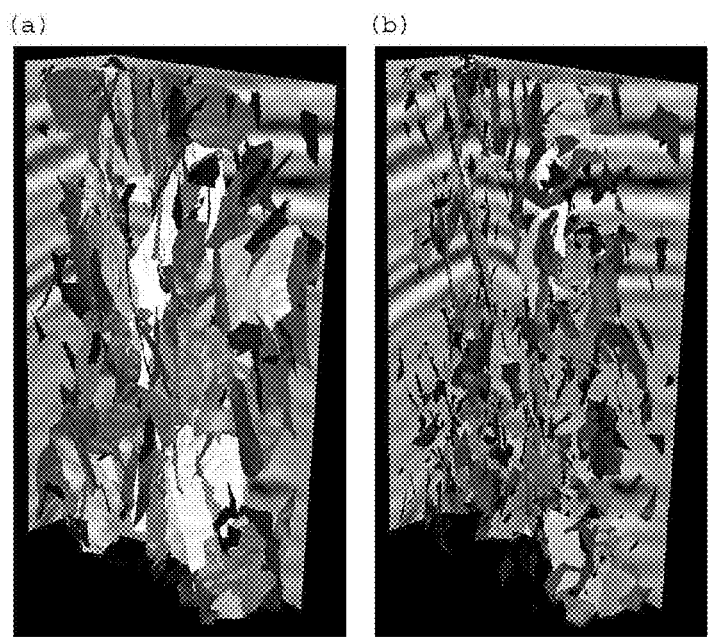
FIG. 3(a) shows a sub-volume overlaid with representations of fractures obtained by employing a fracture network extraction procedure, and FIG. 3(b) the same sub-volume overlaid with representations of fractures obtained by employing a modified fracture network extraction procedure.

FIG. 3(a) shows the result of applying such a procedure to a sub-volume containing a fracture network. The extracted fractures appear as differently shaded surfaces overlaid on the seismic sub-volume, each fracture being extracted as a set of 3D coordinates describing points along the fracture.

It is typical to apply the extraction procedure in a consistent manner across and between vintages. FIG. 3(b) shows the result of applying the same extraction procedure as applied to FIG. 3(a) to the same sub-volume but employing different constraints to modify behaviour of the swarm intelligence. Clearly, the shapes and areas of the resulting extracted fractures differ between FIGS. 3(a) and (b). For this reason, any constraints on the fracture extraction procedure are preferably kept constant for all vintages.

Parameterisation of Fracture Networks

The geometrical representation of each extracted fracture is parameterised, resulting in a set of scalar or vector properties describing each fracture, and collectively describing the fracture population of the particular network. Examples of such parameterizations are the calculation of a fracture's orientation, represented through inclination and strike azimuth, and the area of the extracted fracture.

The procedure for parameterising the extracted fractures is preferably kept constant for all vintages.

Fracture Parameter Distributions

The fracture populations of each fracture network of the seismic vintages are analyzed through distributions of the different fracture parameters defined above. Consistent representations of the distributions are preferably produced for all vintages.

Figure 4:
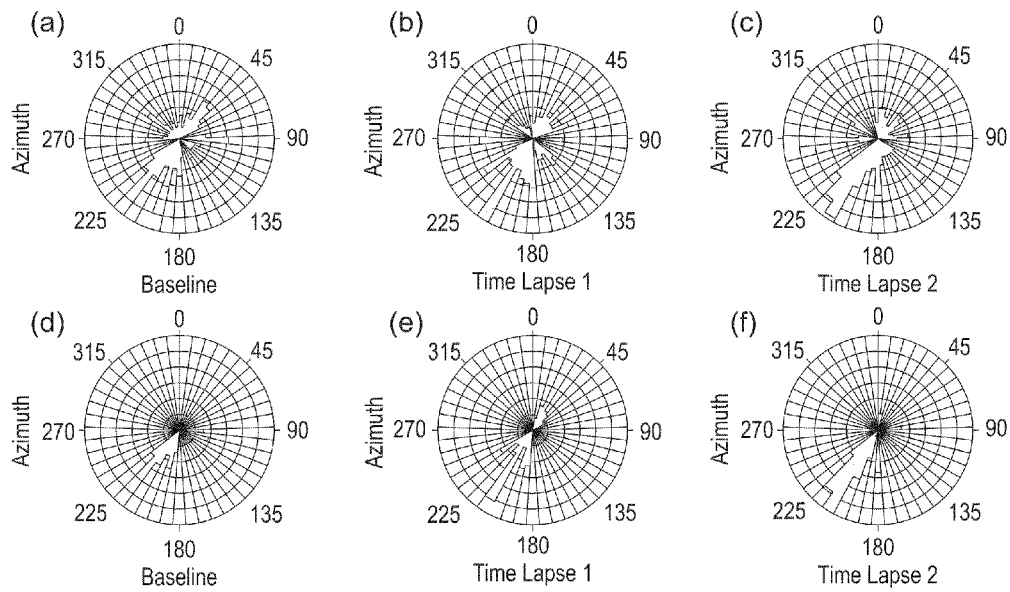
FIGS. 4(a) to (c) show rose diagrams for a fracture network in which the radius of each circle sector gives the number of fractures with strike azimuth within the angle range of that sector, FIG. 4(a) being the distribution for the network in a first vintage, and FIGS. 4(b) and (c) being the corresponding distributions for the network in subsequent vintages.
FIGS. 4(d) to (f) show corresponding rose diagrams in which the radius of each sector is the sum of the areas of the fractures having an azimuth within the angle range of that sector.

FIGS. 4(a) to (c) show examples of fracture parameter distributions based on the strike azimuths of fractures in a fracture network. The distributions are displayed as a rose diagrams. FIG. 4(a) is the distribution for the network in a first vintage, and FIGS. 4(b) and (c) are the corresponding distributions for the network in subsequent vintages. In the rose diagrams of FIGS. 4(a) to (c), the radius of each circle sector gives the number of fractures with azimuth within the angle range of that sector. This representation provides a measure of which fracture orientations are most frequent, and hence indicate the dominant direction of the fracture system.

FIGS. 4(d) to (f) show examples of fracture parameter distributions which are also based on the strike azimuths of the fractures of FIGS. 4(a) to (c) and are for the same vintages. However, in FIGS. 4(d) to (f) a further parameter, the area of each fracture, is combined with azimuth information. That is, the radius of each sector of the rose diagrams of FIGS. 4(d) to (f) is the sum of the areas of the fractures having an azimuth within the angle range of that sector. This provides a measure of which orientation the largest fractures occur in.

Figure 5:
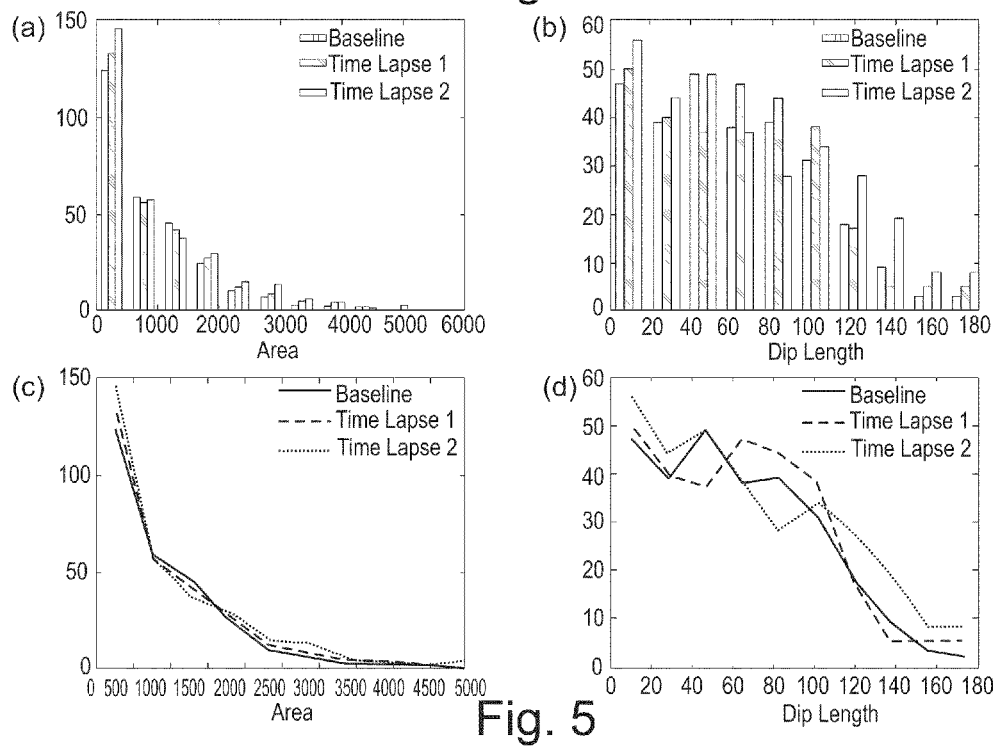
FIG. 5(a) shows a fracture area histogram for the fracture network and vintages of FIGS. 4(a) to (c), the lengths of the bars of the histogram corresponding to the numbers of fractures having fracture areas within different area ranges.
FIG. 5(b) shows a fracture dip length histogram for the fracture network and vintages of FIGS. 4(a) to (c), the lengths of the bars of the histogram corresponding to the numbers of fractures having dip lengths within different dip length ranges, and FIGS. 5(c) and (d) show respectively the same information as provided in the histograms of FIGS. 5(a) and (b) but plotted in the form of curves.

Fracture parameter distributions can also be displayed on histograms. FIG. 5(a) shows a fracture area histogram for the fracture network and vintages of Figures 4(a) to (c). FIG. 5(b) shows a fracture dip length histogram for the fracture network and vintages of FIGS. 4(a) to (c).

FIGS. 5(c) and (d) respectively correspond to FIGS. 5(a) and (b), but show the information plotted as curves rather than as histograms.

Identification of Changes to Fracture Networks

The dynamic behaviour of the fracture networks can be quantified through comparisons of the fracture parameter distributions across vintages. Each comparison is performed within the same sub-volume on each vintage. An example of the type of change which can be observed is variation of the sectors of rose diagrams caused e.g. by a decrease or increase in the number or area of observed fractures. Preferably, the observed changes are considered in combination with a quality metric which ensures that the results are significant.

Figure 6:
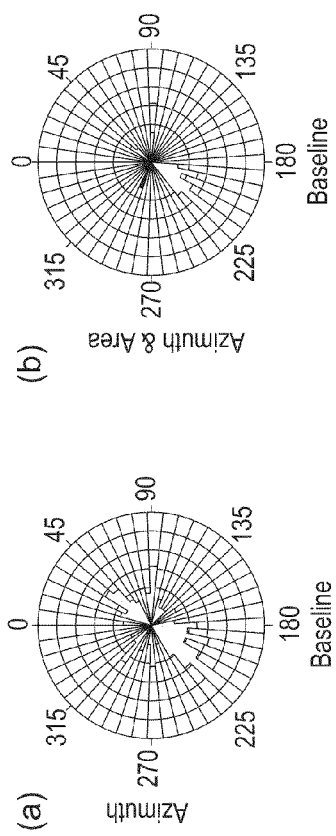
FIGS. 6(a) and (b) show the rose diagrams of FIGS. 4(a) and (d) overlaid with 90% confidence intervals estimated using the non-parametric bootstrap.

A possible approach for comparing pairs of distribution is the statistical method of non-parametric bootstrap (see Efron, B. (2000), The Bootstrap and Modern Statistics, Journal of the American Statistical Association, Vol. 95, No. 452, p. 1293-1296). The bootstrap technique explores the variability within the observed empirical distributions of the data. In this way estimated confidence intervals of the rose diagrams, histograms or curves of FIGS. 4 and 5 can be obtained. For example, FIGS. 6(a) and (b) show the rose diagrams of FIGS. 4(a) and (d) overlaid with 90% confidence intervals estimated using the non-parametric bootstrap.

Confidence intervals can also be estimated for differences between distributions across seismic vintages. For example, the bootstrap can be applied to compare the rose diagrams of FIGS. 4(a) to (c).

Figure 7:
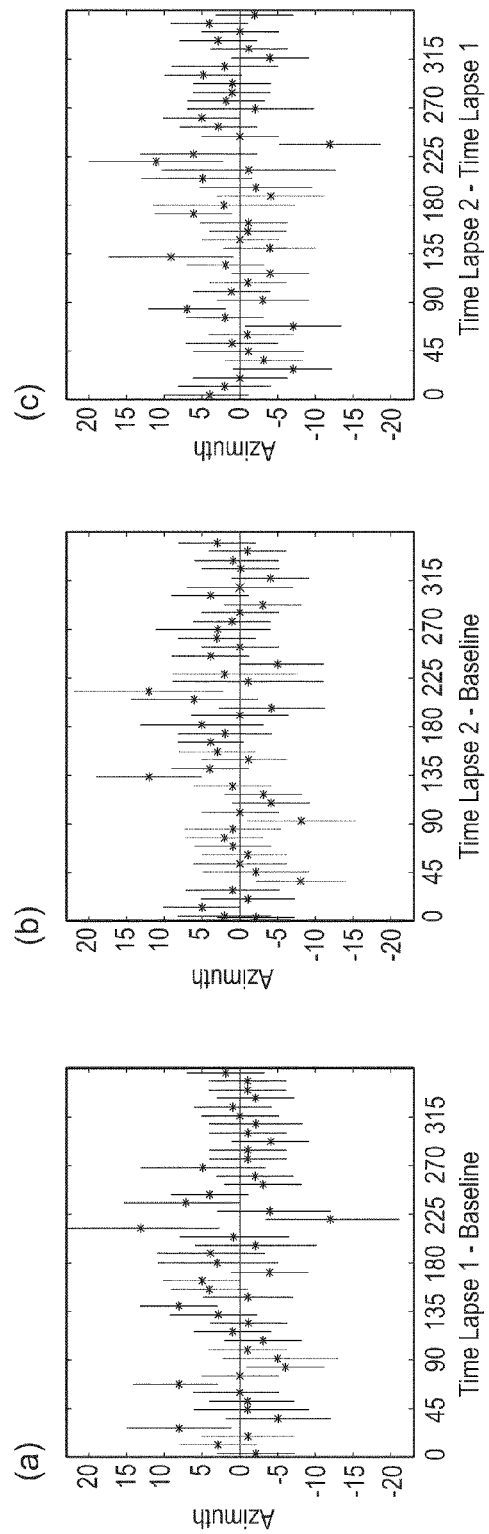
FIGS. 7(a) to (c) plot the difference between the radii of corresponding rose diagram circle sectors against azimuth strike angle, the vertical lines showing estimated 90% confidence intervals for the respective differences, FIG. 7(a) being a comparison of the distributions represented by the rose diagrams of FIGS. 4(a) and (b), FIG. 7(b) being a comparison of the distributions represented by the rose diagrams of FIGS. 4(a) and (c), and FIG. 7(c) being a comparison of the distributions represented by the rose diagrams of FIGS. 4(b) and (c)

FIG. 7(a) is a comparison of the distributions represented by the rose diagrams of FIGS. 4(a) and (b). In FIG. 7(a), plotted against azimuth angle, are stars whose positions indicate the differences between the radii of the corresponding circle sectors (i.e. the differences in the number of fractures) and vertical lines which show the estimated 90% confidence intervals of the respective differences. If a line does not contain the value 0, it indicates that the number of fractures at this azimuth visible in the seismic data differs between the two vintages.

FIG. 7(b) is a corresponding comparison of the distributions represented by the rose diagrams of FIGS. 4(a) and (c), and FIG. 7(c) is a corresponding comparison of the distributions represented by the rose diagrams of FIGS. 4(b) and (c).

When creating many such 90% confidence intervals, 10% can be expected to wrongly leave out the true value of the difference. Furthermore, the bootstrap method only explores the variability within the actual observations, for example to compare if two distributions are significantly different, and does not capture the underlying uncertainty of the observations themselves due to processing, attribute calculation, fracture extraction, or any other steps leading to the final fracture population which produce uncertainty.

Figure 8:
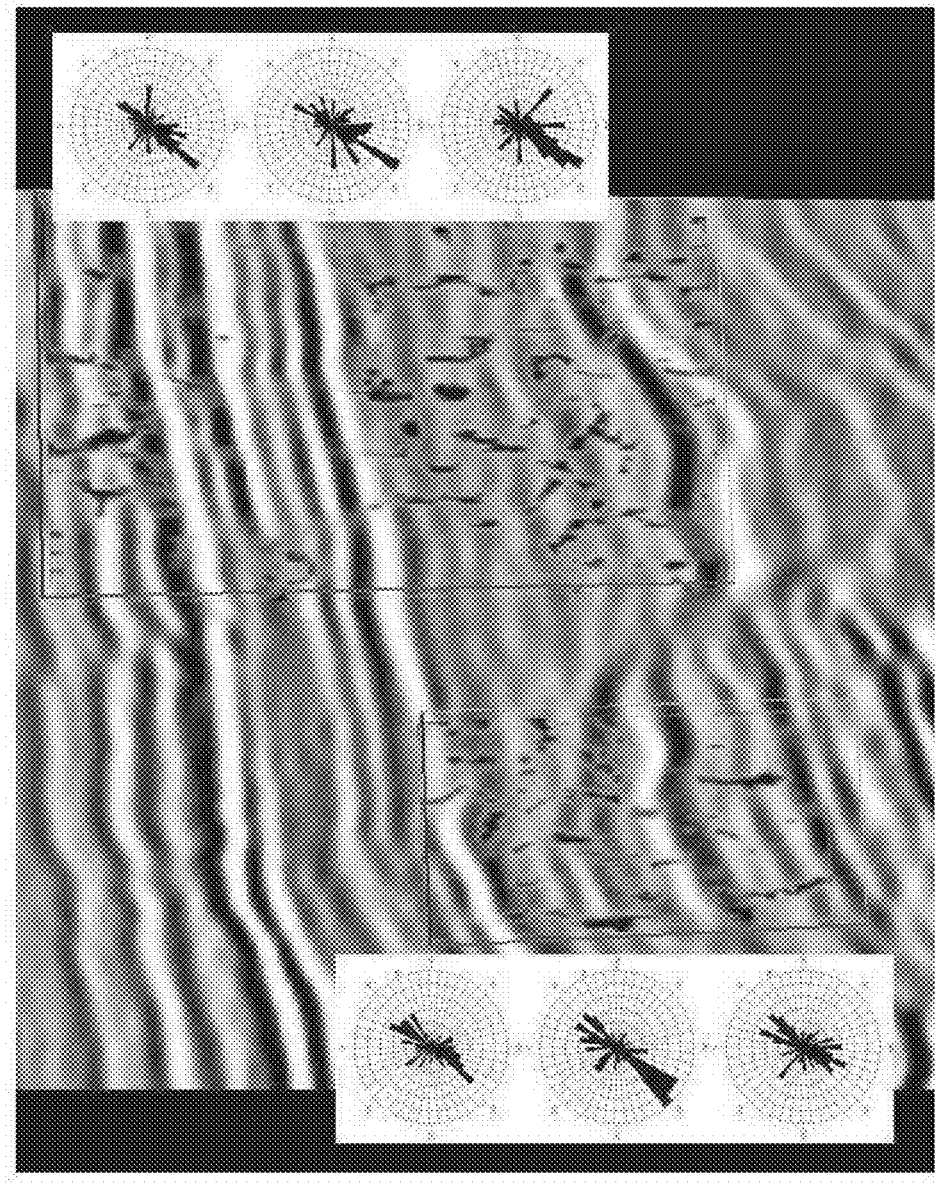
FIG. 8 shows fracture enhancement attributes overlaid onto two sub-volumes of original seismic data, each sub-volume being also associated with a respective set of three rose diagrams corresponding to different vintages.

A spatial description of changes in fracture signatures can also be obtained. For example, FIG. 8 shows fracture enhancement attributes overlaid onto two sub-volumes of original seismic data. Each sub-volume is also associated with a respective set of three rose diagrams, the top rose diagrams of each set showing the fracture azimuth distribution for the fracture network in the original seismic data, and the middle and lower time rose diagrams showing corresponding rose diagrams for two subsequent vintages. Such visual representations can be usefully applied in analyses of fluid flow in or related to the fracture network, and can for example broaden understanding of changes that take place in or around the reservoirs particularly when analyzed in combination with well logs and other techniques for characterising dynamic phenomena.

In practical terms, this type of analysis can be used to decide, for example, whether well injection operations should be continued or discontinued, or whether a new well should be drilled in a particular location.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to herein are incorporated by reference.

The invention claimed is:

1. A method of operating a well, comprising:
providing a plurality of seismic time lapse vintages of the same geological volume;
analyzing the dynamic behavior of fracture networks in a seismic volume, by:
(a) identifying and parameterizing fractures within fracture networks of each vintage,
(b) determining one or more distributions of fracture parameters for the fracture networks of each vintage, and
(c) identifying changes to the fracture networks by comparing corresponding distributions across the vintages; and
using the identified changes to operate the well.

2. A method according to claim 1, wherein the geological volume is a sub-volume of a larger geological volume, and the providing and analyzing steps are repeated for one or more further sub-volumes within the larger geological volume.

3. A method according to claim 1, wherein the provided seismic time lapse vintages are compensated for seismic velocity changes that take place in the periods between vintages.

4. A method according to claim 1, wherein, in (c), each comparison between corresponding distributions across the vintages includes determining a quality metric for the comparison.

5. A method according to claim 1, wherein, in (a), the identification includes determining a fracture enhancement attribute for the seismic time lapse vintages and identifying discontinuities in the attribute.

6. A method according to claim 1, wherein, in (a), the parameterization includes determining the strike azimuths of the fractures in each fracture network.

7. A method according to claim 1, wherein, in (a), the parameterization includes determining the inclinations with respect to the horizontal of the fractures in each fracture network.

8. A method according to claim 1, wherein, in (a), the parameterization includes determining the areas of the fractures in each fracture network.

9. A method according to claim 1, wherein, in (c), the comparison includes showing representations of the distributions in association with an image of the geological volume.

10. A method according to claim 1, further including the initial step of:
performing seismic tests to obtain the time lapse vintages.

11. A method according to claim 1, further including the initial steps of:

performing a seismic test to obtain a first seismic time lapse vintage of a geological volume;

injecting a fluid into the well; and performing a further seismic test to obtain a second seismic time lapse vintage of the geological volume;

wherein, in the use step, the identified changes are used to decide whether to inject further fluid into the well.

12. A method of drilling a well including the steps of:

providing a plurality of seismic time lapse vintages of the same geological volume;

analyzing the dynamic behavior of fracture networks in a seismic volume, by:

(a) identifying and parameterizing fractures within fracture networks of each vintage, (b) determining one or more distributions of fracture parameters for the fracture networks of each vintage, and (c) identifying changes to the fracture networks by comparing corresponding distributions across the vintages;

determining a position for a well on the basis of the identified changes; and drilling the well at that position.

13. A method according to claim 12, wherein the geological volume is a sub-volume of a larger geological volume, and the providing and analyzing steps are repeated for one or more further sub-volumes within the larger geological volume.

14. A method according to claim 12, wherein the provided seismic time lapse vintages are compensated for seismic velocity changes that can take place in the periods between vintages.

15. A method according to claim 12, wherein, in (c), each comparison between corresponding distributions across the vintages includes determining a quality metric for the comparison.

16. A method according to claim 12, wherein, in (a), the identification includes determining a fracture enhancement attribute for the seismic time lapse vintages and identifying discontinuities in the attribute.

17. A method according to claim 12, wherein, in (a), the parameterization includes determining the strike azimuths of the fractures in each fracture network.

18. A method according to claim 12, wherein, in (a), the parameterization includes determining the inclinations with respect to the horizontal of the fractures in each fracture network.

19. A method according to claim 12, wherein, in (a), the parameterization includes determining the areas of the fractures in each fracture network.

20. A method according to claim 12, wherein, in (c), the comparison includes showing representations of the distributions in association with an image of the geological volume.

21. A method according to claim 12, further including the initial step of:

performing seismic tests to obtain the time lapse vintages.

22. A computer system which analyses the dynamic behavior of fracture networks in a geological volume, the computer system comprising:

an input device or storage device which provides a plurality of seismic time lapse vintages of the same geological volume; and a processor or processors which: (a) identify and parameterize fractures within fracture networks of each vintage, (b) determine one or more distributions of fracture parameters for the fracture networks of each vintage, and (c) identify changes to the fracture networks by comparing corresponding distributions across the vintages.

23. A computer system according to claim 22, wherein the processor or processors compensate the seismic time lapse vintages for seismic velocity changes that can take place in the periods between vintages.

24. A computer system according to claim 22, wherein the processor or processors determine a quality metric for each comparison between corresponding distributions across the vintages.

25. A computer system according to claim 22, wherein, to identify fractures within fracture networks, the processor or processors determine a fracture enhancement attribute for the seismic time lapse vintages and identify discontinuities in the attribute.

26. A computer system according to claim 22, wherein, to parameterize fractures within fracture networks, the processor or processors determine the strike azimuths of the fractures in each fracture network.

27. A computer system according to claim 22, wherein, to parameterize fractures within fracture networks, the processor or processors determine the inclinations with respect to the horizontal of the fractures in each fracture network.

28. A computer system according to claim 22, wherein, to parameterize fractures within fracture networks, the processor or processors determine the areas of the fractures in each fracture network.

29. A computer system according to claim 22 which further comprises:

a display which shows representations of the distributions in association with an image of the geological volume.

* * * * *